UNITED STATES PATENT OFFICE.

HARRY B. EIGELBERNER, OF OAK PARK, ILLINOIS.

PROCESS OF RENOVATING BUTTER.

1,210,918.  Specification of Letters Patent.  Patented Jan. 2, 1917.

No Drawing.  Application filed March 22, 1915.  Serial No. 16,245.

*To all whom it may concern:*

Be it known that I, HARRY B. EIGELBERNER, a citizen of the United States, residing at Oak Park, in the county of Cook and State of Illinois, have invented new and useful Improvements in Processes of Renovating Butter, of which the following is a specification.

The purpose of this invention is to provide an improved means of renovating butter,—that is, depriving it of all foreign or unclean odors or those resulting from rancidity or putridity.

It consists in the succession of steps hereinafter described, as indicated in the claims.

It is well known that butter not only acquires unpleasant flavors and odors by reasons of changes in the small remnants of other substances beside butter oil which are derived from milk, but also by reason of the capacity of butter oil for absorbing odors and flavors from entirely foreign substances and from the atmosphere. It is also well known that the unpleasant odor or flavor due to rancidity or putridity, which results from decay, not of the butter oil itself, but only of the said small remnants of other substances derived from the milk, tends to remain in the butter after all traces of these other decayed substances are removed and after all rancid or putrid condition has been corrected. That is to say, butter oil or butter which is in itself entirely pure and clean so far as the presence in it of any actual unclean substance or impurity is concerned, may become and remain exceedingly foul as to odor and taste. By the present invention I remove the odor and flavor which is unnatural, impure or unpleasant, without in any respect affecting the chemical or physical condition of the butter or butter oil, and without removing any tangible or measurable or ponderable substance therefrom.

My process consists fundamentally and generically in exposing the butter or other oleaginous substance having the foul odor or flavor to a bath containing a deodorant,—that is, a substance having the capacity of absorbing odors and flavors, such bath being also a solution containing a suitable preventive of the chemical action of the deodorant, so that the oil to be deodorized and de-flavored may remain in the presence of the odor-and-flavor-absorbent for any length of time necessary to complete absorption of the odor or flavor without producing any chemical action or causing any physical or organic change in the oil itself.

I use the term "absorb" and "absorbent" and the term "deodorant" in accordance with common phraseology without intending to state what actually happens for causing the odors and flavors to disappear from the oil, and without intending to be understood as stating that any such action as absorption actually occurs. So far as I am aware, it is not known that any measurable or ponderable substance is removed from the butter or added to the so-called absorbent or deoderant in the process; but the odor or flavor disappears from the butter and is found afterward pertaining to the so-called absorbent or deodorant, and the property of acting in this manner, and this only, is what I intend to express by the word "absorbent" and "deodorant".

My process specifically consists of and comprises the following steps: First, I wash the butter in hot water. The purpose of this step is merely to remove mechanical impurities and may be dispensed with or comprised in the next step which consists in treating the butter with hot water containing a small proportion of lime in some form, preferably marble dust, to neutralize the decomposition acids, such as the butyric acid and any other volatile acids contained in the butter as the result of decomposition. After separating the butter oil from the acid-neutralizing bath, it is next thoroughly intermixed by agitation with a hot saturated common salt solution in which there has been dissolved zinc chlorid to the extent of from one-tenth to one-fifth of one per cent. of the total solution. The butter oil is allowed to remain in this solution for ten hours or longer. The zinc chlorid has the deodorizing effect described, and the common salt prevents the chemical action of the zinc chlorid which would otherwise occur if used alone, and which is, of course, undesirable, since no chemical change in the butter oil is wanted. After such exposure to said salt and zinc-chlorid solution, it is separated from the same and washed with hot water to remove all trace of the zinc chlorid and salt. The butter oil is next dried, preferably by steam heat, all the moisture being driven off and the butter oil being rendered clear. The following results are observed from this treatment: First, all foreign odors are removed without in any respect affecting the chemical, organic or physical character of the butter oil, and without removing the natural and proper odor of such butter oil. Second, the butter oil retains all its natural structural characteristics and physical appearance and properties for all purposes for which such butter oil is used, including the capacity for being converted back into true butter form by emulsion or churning with a small amount of water or milk. Third, the butter oil thus treated contains no traces whatever of the materials used in the treatment. It is in all respects perfectly like butter oil produced by the usual means from perfectly pure untainted butter; and this is the case however foul or putrid the butter may have seemed to be before the commencement of the treatment, and whether the odors and flavors which it possesses or holds are animal, vegetable or chemical.

I claim:—

1. The process of renovating oleaginous food products which comprises the following steps: first: neutralizing the acids by washing the oleaginous material in a hot lime solution, and afterward separating the oil from such solution; second: exposing the oil at length for slow action in a hot solution containing a deodorant and a preventant of the chemical action of the deodorant, and subsequently separating the oil from such solution; third: washing out any remaining traces of the last mentioned solution; fourth: removing the moisture from the oil by heat.

2. The process of renovating butter which comprises the following steps: first: neutralizing the butyric and other volatile acids by washing the butter in a hot water containing lime, separating the lime water from the butter oil and washing the latter in clear water to remove traces of the line; second: thoroughly intermixing the butter oil with a hot saturated solution of common salt containing a small percentage of a deodorant whose chemical action on the butter oil is prevented by the salt solution, and maintaining the elements intermixed for a length of time for slow action of the deodorant and then separating the oil from the solution; third: washing the oil in hot water to remove traces of the last mentioned solution, and subsequently removing moisture from the oil by heat.

3. The process of renovating butter, or like oleaginous material which comprises the following steps: first: neutralizing the butyric and other volatile acids by washing the butter in a hot water containing lime, separating the said solution from the butter oil and washing the latter in clear water to remove traces of lime; second: mixing and maintaining for several hours mixture of the butter oil with a hot saturated solution of common salt containing a small fraction of one per cent. of chlorid of zinc, and afterward separating the oil from said solution; third: washing the oil in hot water to remove traces of the zinc chlorid and salt, and subsequently removing moisture from the oil by heat.

4. The process of removing foreign odors from oleaginous substances which have a capacity of absorbing odors which comprises maintaining such oleaginous material in mixture for several hours with a solution containing a very small percentage of an odor absorbent and a preventant of the chemical action of such absorbent on the oil.

In testimony whereof, I have hereunto set my hand at Chicago, Ill., this 18 day of March, A. D., 1915.

HARRY B. EIGELBERNER.

Witnesses:
Chas. S. Burton,
Edna M. MacIntosh.